United States Patent
Sun (10) Patent No.: US 12,445,566 B2
(45) Date of Patent: Oct. 14, 2025

(54) METHOD, APPARATUS AND DEVICE FOR REALIZING SHUTTER SYNCHRONIZATION OF CAMERA

(71) Applicant: ZHEJIANG UNIVIEW TECHNOLOGIES CO., LTD., Zhejiang (CN)

(72) Inventor: Mingming Sun, Zhejiang (CN)

(73) Assignee: ZHEJIANG UNIVIEW TECHNOLOGIES CO., LTD., Hangzhou (CN)

( * ) Notice: Subject to any disclaimer, the term of this patent is extended or adjusted under 35 U.S.C. 154(b) by 91 days.

(21) Appl. No.: 18/559,188

(22) PCT Filed: Dec. 23, 2021

(86) PCT No.: PCT/CN2021/140670
§ 371 (c)(1),
(2) Date: Nov. 6, 2023

(87) PCT Pub. No.: WO2022/233143
PCT Pub. Date: Nov. 10, 2022

(65) Prior Publication Data
US 2024/0244155 A1    Jul. 18, 2024

(30) Foreign Application Priority Data

May 6, 2021   (CN) .......................... 202110492201.8

(51) Int. Cl.
*H04N 5/06*   (2006.01)
*H04N 23/45*   (2023.01)
(Continued)

(52) U.S. Cl.
CPC ............... *H04N 5/06* (2013.01); *H04N 23/45* (2023.01); *H04N 23/633* (2023.01); *H04N 23/741* (2023.01)

(58) Field of Classification Search
CPC ........ H04N 5/06; H04N 23/45; H04N 23/633; H04N 23/741
See application file for complete search history.

(56) References Cited

U.S. PATENT DOCUMENTS 5,487,092 A * 1/1996 Finney ...................... H04L 7/02
375/373
6,108,782 A * 8/2000 Fletcher .................. H04L 43/12
713/153
(Continued)

FOREIGN PATENT DOCUMENTS

CN         103676453 A      3/2014
CN         107439000 A     12/2017
(Continued)

OTHER PUBLICATIONS

International Search Report in Application No. PCT/CN2021/140670, dated Mar. 14, 2022, 5 pages, including translation.
(Continued)

*Primary Examiner* — Michael B. Pierorazio
(74) *Attorney, Agent, or Firm* — MASCHOFF BRENNAN (57) ABSTRACT

Provided are a method, apparatus and device for realizing shutter synchronization of a camera. The camera may include a plurality of sensors; the shutter types of the plurality of sensors are different; the method may include: acquiring a periodic synchronization reference signal and a synchronization signal corresponding to each sensor; and adjusting, with the synchronization reference signal as a reference, synchronization signal delays and/or exposure delays of the plurality of sensors to align the exposure areas corresponding to the plurality of sensors.

17 Claims, 5 Drawing Sheets

(51) Int. Cl.
*H04N 23/63* (2023.01)
*H04N 23/741* (2023.01)

(56) References Cited

U.S. PATENT DOCUMENTS

| | | | | |
|---|---|---|---|---|
| 6,907,041 | B1* | 6/2005 | Turner | H04L 12/5601 |
| | | | | 370/414 |
| 7,134,035 | B2* | 11/2006 | Sharma | G06F 1/12 |
| | | | | 713/400 |
| 7,424,080 | B1* | 9/2008 | Liu | H04N 21/4382 |
| | | | | 375/E7.278 |
| 8,290,423 | B2* | 10/2012 | Wang | H04B 17/23 |
| | | | | 455/2.01 |
| 8,923,141 | B2* | 12/2014 | Bryant | H04J 3/0679 |
| | | | | 370/252 |
| 9,058,135 | B1* | 6/2015 | Schumacher | G06F 1/10 |
| 10,057,541 | B2* | 8/2018 | Chung | H04N 7/144 |
| 2002/0059535 | A1* | 5/2002 | Bekritsky | H04L 51/48 |
| | | | | 342/465 |
| 2005/0280702 | A1 | 12/2005 | Nakano et al. | |
| 2006/0195780 | A1* | 8/2006 | Zuccolotto | G06F 40/18 |
| | | | | 715/273 |
| 2006/0203851 | A1* | 9/2006 | Eidson | H04J 3/085 |
| | | | | 370/503 |
| 2007/0124756 | A1* | 5/2007 | Covell | G06F 16/635 |
| | | | | 348/E7.071 |
| 2007/0297799 | A1* | 12/2007 | Tse-Au | H04Q 11/0005 |
| | | | | 398/58 |
| 2008/0069150 | A1* | 3/2008 | Badt | H04J 3/0667 |
| | | | | 370/252 |
| 2008/0082510 | A1* | 4/2008 | Wang | G06F 16/683 |
| 2010/0085989 | A1* | 4/2010 | Belhadj | H04J 3/0667 |
| | | | | 370/503 |
| 2010/0135314 | A1* | 6/2010 | Fourcand | H04J 3/1611 |
| | | | | 370/419 |
| 2010/0272102 | A1* | 10/2010 | Kobayashi | H04N 21/43632 |
| | | | | 370/389 |
| 2011/0164625 | A1* | 7/2011 | Fourcand | H04J 3/0667 |
| | | | | 370/498 |
| 2011/0202967 | A1* | 8/2011 | Hecht | H04N 21/854 |
| | | | | 725/114 |
| 2011/0286442 | A1* | 11/2011 | Maurice | H04W 56/0015 |
| | | | | 370/350 |
| 2011/0317991 | A1* | 12/2011 | Tsai | G03B 9/70 |
| | | | | 396/180 |
| 2012/0059845 | A1* | 3/2012 | Covell | H04N 21/4394 |
| | | | | 707/769 |
| 2012/0162490 | A1* | 6/2012 | Chung | H04N 23/631 |
| | | | | 348/E5.037 |
| 2012/0249806 | A1* | 10/2012 | Gong | H04N 23/63 |
| | | | | 348/E5.045 |
| 2012/0250704 | A1* | 10/2012 | Yamada | H04J 3/0661 |
| | | | | 370/503 |
| 2012/0284434 | A1* | 11/2012 | Warren | G06F 13/00 |
| | | | | 710/22 |
| 2012/0331026 | A1* | 12/2012 | Menkhoff | H03H 17/0433 |
| | | | | 708/300 |
| 2013/0103861 | A1* | 4/2013 | Ahn | H04W 52/0261 |
| | | | | 710/14 |
| 2013/0185374 | A1* | 7/2013 | Fukasawa | H04L 67/00 |
| | | | | 709/208 |
| 2013/0194496 | A1* | 8/2013 | Atherton | H04N 21/242 |
| | | | | 348/E9.034 |
| 2013/0215753 | A1* | 8/2013 | Le Pallec | H04L 47/283 |
| | | | | 370/235 |
| 2014/0150021 | A1* | 5/2014 | Subramanian | H04N 21/235 |
| | | | | 725/36 |
| 2014/0165085 | A1* | 6/2014 | Karacali-Akyamac | |
| | | | | H04N 21/4788 |
| | | | | 725/14 |
| 2014/0196077 | A1* | 7/2014 | Gordon | H04N 21/25816 |
| | | | | 725/31 |
| 2016/0316110 | A1 | 10/2016 | Ross et al. | |
| 2018/0084224 | A1* | 3/2018 | McNelley | H04N 7/15 |
| 2018/0115683 | A1* | 4/2018 | Lee | H04N 23/73 |
| 2018/0183990 | A1 | 6/2018 | Chen et al. | |
| 2018/0309919 | A1 | 10/2018 | Naing et al. | |
| 2019/0058929 | A1* | 2/2019 | Young | H04N 21/235 |
| 2020/0236265 | A1* | 7/2020 | Kim | H04N 23/665 |
| 2020/0252601 | A1* | 8/2020 | Hirano | H04N 13/296 |
| 2020/0267376 | A1* | 8/2020 | Iwasa | H04N 13/296 |
| 2020/0314467 | A1* | 10/2020 | Goldrei | H04N 21/4341 |
| 2020/0358949 | A1* | 11/2020 | Omori | H04N 23/73 |
| 2021/0014439 | A1* | 1/2021 | Yamanaka | H04N 25/78 |
| 2022/0207658 | A1* | 6/2022 | Tong | G06T 5/73 |
| 2022/0343472 | A1* | 10/2022 | Ollila | G06F 3/013 |
| 2022/0398759 | A1* | 12/2022 | Schindler | G06V 10/145 |
| 2023/0143803 | A1* | 5/2023 | Lee | G09G 3/2011 |
| | | | | 345/690 |
| 2023/0403906 | A1* | 12/2023 | Metz | H10K 59/90 |

FOREIGN PATENT DOCUMENTS

| | | |
|---|---|---|
| CN | 108259702 A | 7/2018 |
| CN | 108781259 A | 11/2018 |
| CN | 111955001 A | 11/2020 |

OTHER PUBLICATIONS

Extended European Search Report in Application No. 21939787.4, dated Mar. 18, 2025, 15 pages.

* cited by examiner

METHOD, APPARATUS AND DEVICE FOR REALIZING SHUTTER SYNCHRONIZATION OF CAMERA

CROSS-REFERENCE TO RELATED APPLICATIONS

This is a national stage application filed under 37 U.S.C. 371 based on International Patent Application No. PCT/CN2021/140670, filed Dec. 23, 2021, which claims priority to Chinese Patent Application No. 202110492201.8 filed with the China National Intellectual Property Administration (CNIPA) on May 6, 2021, the disclosures of which are incorporated herein by reference in their entireties.

TECHNICAL FIELD

The present application relates to camera control technology, for example, a method, apparatus and device for realizing shutter synchronization of a camera.

BACKGROUND

For cameras having multiple sensors, multiple sensors are the same or the shutter types of the multiple sensors are the same. If the shutter types of the multiple sensors are different, shutter synchronization cannot be realized, and the picture will be shifted under high-speed dynamic scenes.

SUMMARY

The present application provides a method, apparatus and device for realizing shutter synchronization of a camera to realize shutter synchronization of multiple sensors.

The present application provides a method for realizing shutter synchronization of a camera. The camera may include multiple sensors, and the shutter types of the multiple sensors are different. The method may include the following steps.

A periodic synchronization reference signal and a synchronization signal corresponding to each sensor are acquired.

Synchronization signal delays and/or exposure delays of the multiple sensors are adjusted with the synchronization reference signal as a reference to align the exposure areas corresponding to the multiple sensors.

The present application further provides an apparatus for realizing shutter synchronization of a camera. The camera includes multiple sensors, and the shutter types of the multiple sensors are different. The apparatus may include a counting unit and a synchronization signal unit.

The counting unit may be configured to acquire a periodic synchronization reference signal and a synchronization signal corresponding to each sensor.

The synchronization signal unit may be configured to adjust, with the synchronization reference signal as a reference, synchronization signal delays and/or exposure delays of the multiple sensors to align the exposure areas corresponding to the multiple sensors.

The present application further provides a device for realizing shutter synchronization of a camera. The device may include a processor and a computer-readable storage medium. The computer-readable storage medium is configured to store instructions, where the instructions, when executed by the processor, implement the method for realizing shutter synchronization of a camera.

DETAILED DESCRIPTION

While various embodiments are described in the present application, the description is intended to be exemplary, rather than limiting, and many more embodiments and implementations are possible that are within the scope of the embodiments described in the present application. Although many possible combinations of features are shown in the accompanying drawings and discussed in the description, many other combinations of the disclosed features are possible. Any feature or element of any embodiment may be used in combination with or as a substitute for any other feature or element in any other embodiment unless specifically restricted.

The present application includes and contemplates combinations of known features and elements. The embodiments, features and elements already disclosed in the present application may also be combined with any conventional feature or element to form a unique embodiment as defined by the claims. Any feature or element of any embodiment may also be combined with features or elements from other embodiments to form another unique embodiment defined by the claims. Accordingly, any feature illustrated and/or discussed in the present application may be implemented alone or in any suitable combination. Accordingly, the embodiments are not to be restricted except in light of the attached claims and their equivalents and substitutions. In addition, various modifications and changes may be made within the scope of the attached claims.

Further, in describing representative embodiments, the specification may have presented the method and/or process as a particular sequence of steps. However, to the extent that the method or process does not rely on the particular order of steps set forth herein, the method or process should not be limited to the particular sequence of steps described. Other sequences of steps are possible. Therefore, the particular order of steps set forth in the specification should not be construed as limitations on the claims. In addition, the claims directed to the method and/or process should not be limited to the performance of their steps in the order written.

Figure 1:
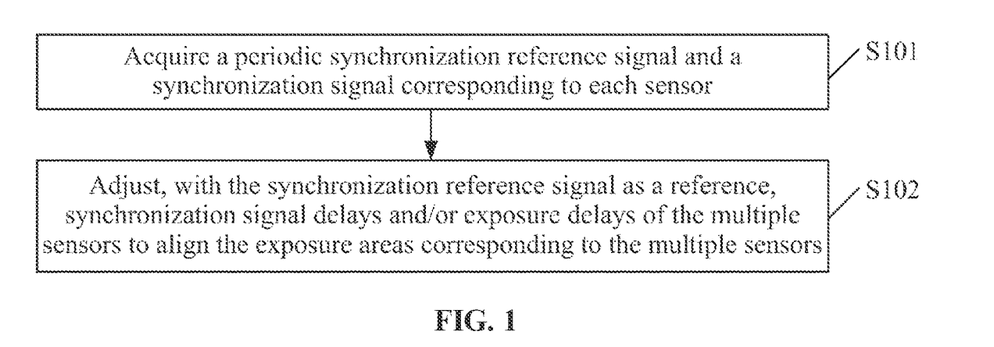
FIG. 1 is a flowchart of a method for realizing shutter synchronization of a camera according to an embodiment of the present application.

Embodiments of the present application provide a method for realizing shutter synchronization of a camera. The camera may include multiple sensors, and the shutter types of the multiple sensors are different. As shown in FIG. 1, the method may include steps S101 to S102.

In S101, a periodic synchronization reference signal and a synchronization signal corresponding to each sensor are acquired.

In S102, synchronization signal delays and/or exposure delays of the multiple sensors are adjusted with the synchronization reference signal as a reference to align the exposure areas corresponding to the multiple sensors.

In an exemplary embodiment of the present application, a shutter synchronization scheme is provided. The synchronization signal of the sensor may be dynamically adjusted according to the change in the shutter to ensure that the shutter times (that is, exposure durations) of different sensors are all in the same region in the shutter control diagram, thereby realizing shutter synchronization of the multiple sensors of different shutter types.

Figure 2:
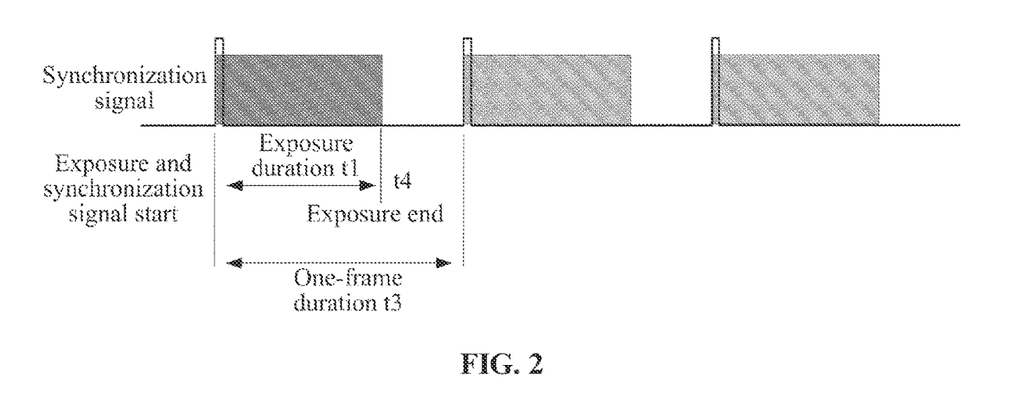
FIG. 2 is a schematic diagram of a first-type exposure and synchronization manner of a sensor according to an embodiment of the present application.

In an exemplary embodiment of the present application, the exposure mode of the sensor may include 2 types, and the working mode of the sensor of the first exposure type may be as shown in FIG. 2, where the synchronization signal is a periodic pulse, and the grey portion is the exposure area. At the rising edge of the synchronization signal, the sensor starts the exposure, lasts for the time t1 (exposure duration) and then ends. The exposure duration t1 may be self-configured, and the time between the end of the exposure and the start of the exposure of a next frame is t4. These two periods of time add up to a one-frame period t3 which may satisfy the following relation:

$$t3 = t1 + t4; \quad \text{Relation 1.}$$

Figure 3:
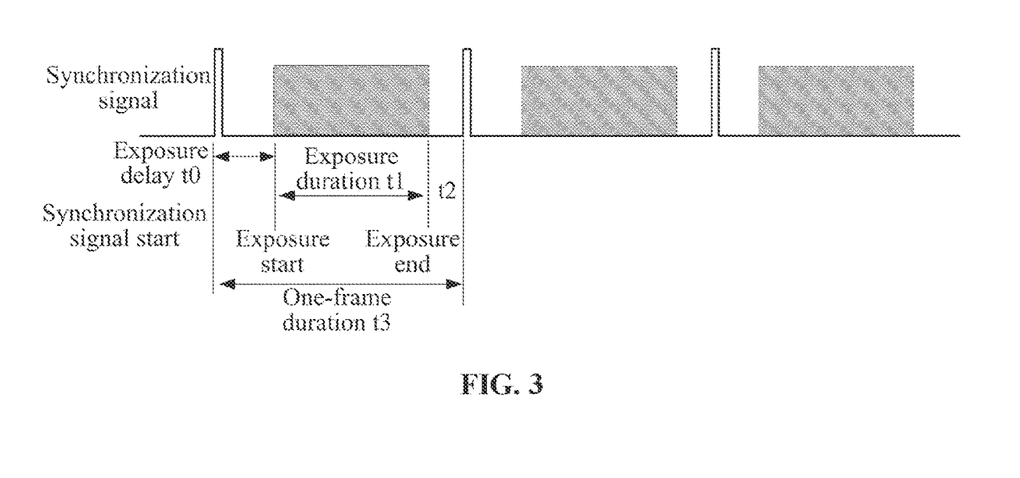
FIG. 3 is a schematic diagram of a second-type exposure and synchronization manner of a sensor according to an embodiment of the present application.

In an exemplary embodiment of the present application, the working mode of the sensor of the second exposure type may be as shown in FIG. 3, where the synchronization signal is a periodic pulse, and the grey portion is the exposure area. At the rising edge of the synchronization signal, the sensor does not start the exposure but delays for a period of time t0 (that is, an exposure delay) before starting the exposure, and the exposure lasts for the time t1 and then ends. The exposure duration t1 may be self-configured, and the idle duration after the end of the exposure is t2 which may be generally a fixed value or 0. The delay of the start of the exposure with respect to the synchronization signal is an exposure delay which satisfies the following relation:

$$t3 = t0 + (t1 + t2); \quad \text{Relation 2.}$$

In the above relation, t3 is the duration of one frame of the synchronization signal (which can be referred to as one-frame duration, that is, one-frame period). Therefore, the following relation may be obtained from Relation 2:

$$t1 = t3 - t0 - t2; \quad \text{Relation 3.}$$

The exposure delay t0 varies with the exposure duration t1 and one-frame duration t3. Each time the exposure duration of the sensor changes, in addition to sensor parameters, the delay parameter t0 of the sensor also needs to be configured.

In an exemplary embodiment of the present application, the multiple sensors may include a first sensor and a second sensor; the synchronization signal may include a first synchronization signal corresponding to the first sensor and a second synchronization signal corresponding to the second sensor.

The frame period and the exposure duration of a first synchronization signal of an i-th frame are the same as the frame period and the exposure duration of a second synchronization signal of an i-th frame, where i is a positive integer; the exposure starts from the rising edge of a first synchronization signal of each frame, and the exposure starts after a preset exposure delay is executed on a second synchronization signal of each frame.

In an exemplary embodiment of the present application, the scheme of the embodiment of the present application may include multiple sensors of different shutter types, and each sensor may correspond to a synchronization signal for synchronizing the multiple different sensors. A synchronization signal may also be included as a reference, that is, a synchronization reference signal.

In an exemplary embodiment of the present application, the scheme of the embodiment of the present application may be illustrated by using two sensors as an example. The first sensor corresponds to the first synchronization signal, and the second sensor corresponds to the second synchronization signal.

In an exemplary embodiment of the present application, when the exposure time period corresponding to a second synchronization signal of a j-th frame is to be aligned with the exposure time period corresponding to a first synchronization signal of a j-th frame, the step where the synchronization signal delays and/or exposure delays of the multiple sensors are adjusted with the synchronization reference signals as a reference may include the following steps.

The rising edge of the second synchronization signal of the j-th frame is aligned with the rising edge of a synchronization reference signal of a j-th frame, where j is a positive integer.

A delay is performed on the first synchronization signal of the j-th frame with the duration of an exposure delay of the second synchronization signal of the j-th frame as the duration of a synchronization signal delay of the first synchronization signal of the j-th frame and the rising edge of the synchronization reference signal of the j-th frame as a starting point.

Figure 4:
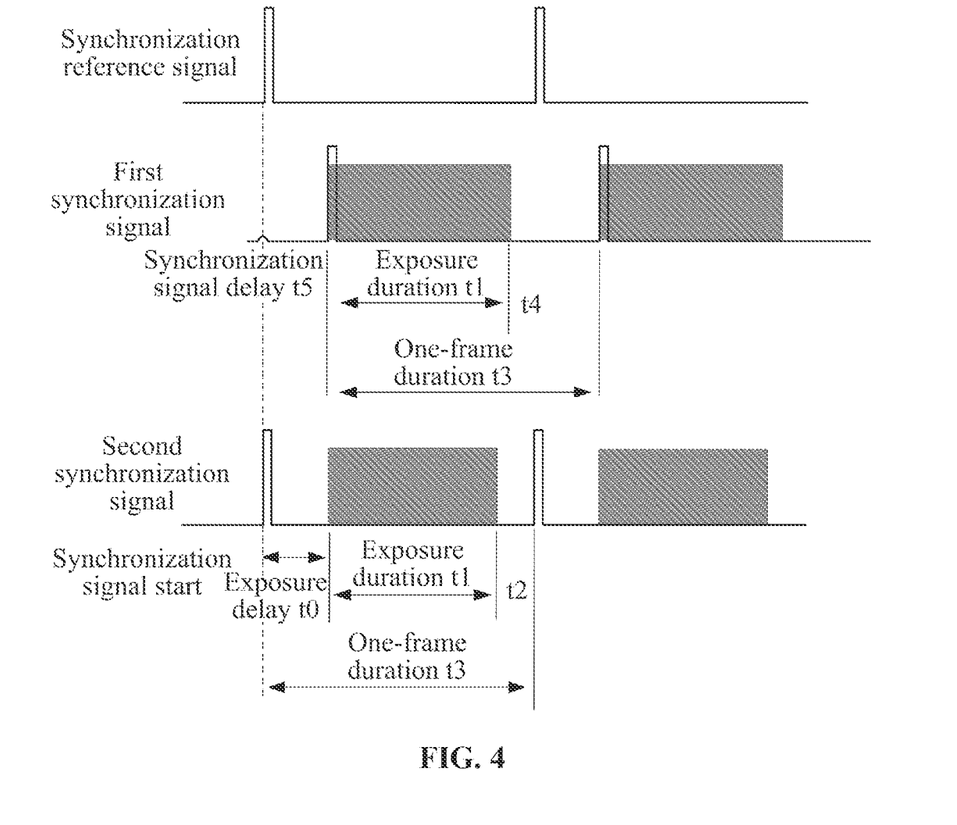
FIG. 4 is a schematic diagram of a shutter synchronization manner for different types of sensors according to an embodiment of the present application.

In an exemplary embodiment of the present application, as shown in FIG. 4, in the case of two sensors, the second synchronization signal and the synchronization reference signal are kept unchanged, and the delay t5 (which may be referred to as synchronization signal delay, that is, the delay of the first synchronization signal of the j-th frame) of the first synchronization signal with respect to the synchronization reference signal is adjusted. The exposure delay of the sensor corresponding to the second synchronization signal is to, and as can be seen from FIG. 4, the exposure areas (the areas corresponding to the exposure time periods in FIG. 4) of the two sensors are synchronized when t5=t0. t2 is generally a fixed value or 0, and to may be calculated according to Relation 3 when the exposure duration t1 and the one-frame duration t3 are determined.

In an exemplary embodiment of the present application, as can be seen from FIG. 4, the exposure areas of the two sensors are aligned with each other after the first synchronization signal is adjusted with the synchronization signal delay t5.

In an exemplary embodiment of the present application, the method may further include the following steps.

When the exposure time period corresponding to a second synchronization signal of an m-th frame is to be aligned with the exposure time period corresponding to a first synchronization signal of an m-th frame and when where the frame periods and/or the exposure durations of the first synchronization signal of the m-th frame and the second synchronization signal of the m-th frame change, an exposure delay corresponding to the second synchronization signal of the m-th frame is calculated according to the change in the frame periods and/or the exposure durations of the first synchronization signal of the m-th frame and the second synchronization signal of the m-th frame, where m is a positive integer.

The exposure time period of the first synchronization signal of the m-th frame is aligned with the exposure time period of the second synchronization signal of the m-th frame according to the exposure delay of the second synchronization signal of the m-th frame.

In an exemplary embodiment of the present application, the step where the exposure delay corresponding to the second synchronization signal of the m-th frame is calculated according to the change in the frame periods and/or the exposure durations may include the following step.

The exposure duration t1 is subtracted from the frame period t3 of the second synchronization signal of the m-th frame, and a set idle duration t2 after the exposure duration when the exposure ends is subtracted, the difference obtained is taken as the exposure delay t5 corresponding to the second synchronization signal of the m-th frame.

In an exemplary embodiment of the present application, the method may further include the following step: the calculation of the exposure delay corresponding to the second synchronization signal of the m-th frame is completed before the arrival of the rising edge of a synchronization reference signal of an m-th frame.

In an exemplary embodiment of the present application, the calculation of the exposure delay is completed before the arrival of the rising edge of the synchronization reference signal, and the exposure areas are aligned according to the exposure delay before the arrival of the rising edge of the synchronization reference signal. The scheme of this embodiment may provide a technical basis for ensuring the shutter synchronization of two sensors.

In an exemplary embodiment of the present application, the step where the exposure time period of the first synchronization signal of the m-th frame is aligned with the exposure time period of the second synchronization signal of the m-th frame according to the exposure delay of the second synchronization signal of the m-th frame may include the following steps.

The rising edge of the second synchronization signal of the m-th frame is aligned with the rising edge of the synchronization reference signal of the m-th frame.

A delay of the rising edge of the exposure time period corresponding to the first synchronization signal of the m-th frame with respect to the rising edge of the synchronization reference signal of the m-th frame is adjusted according to the exposure delay of the second synchronization signal of the m-th frame.

A delay is performed on the first synchronization signal of the m-th frame with the duration of the exposure delay of the second synchronization signal of the m-th frame as the duration of a synchronization signal delay of the first synchronization signal of the m-th frame and the rising edge of the synchronization reference signal of the m-th frame as a starting point.

Figure 5:
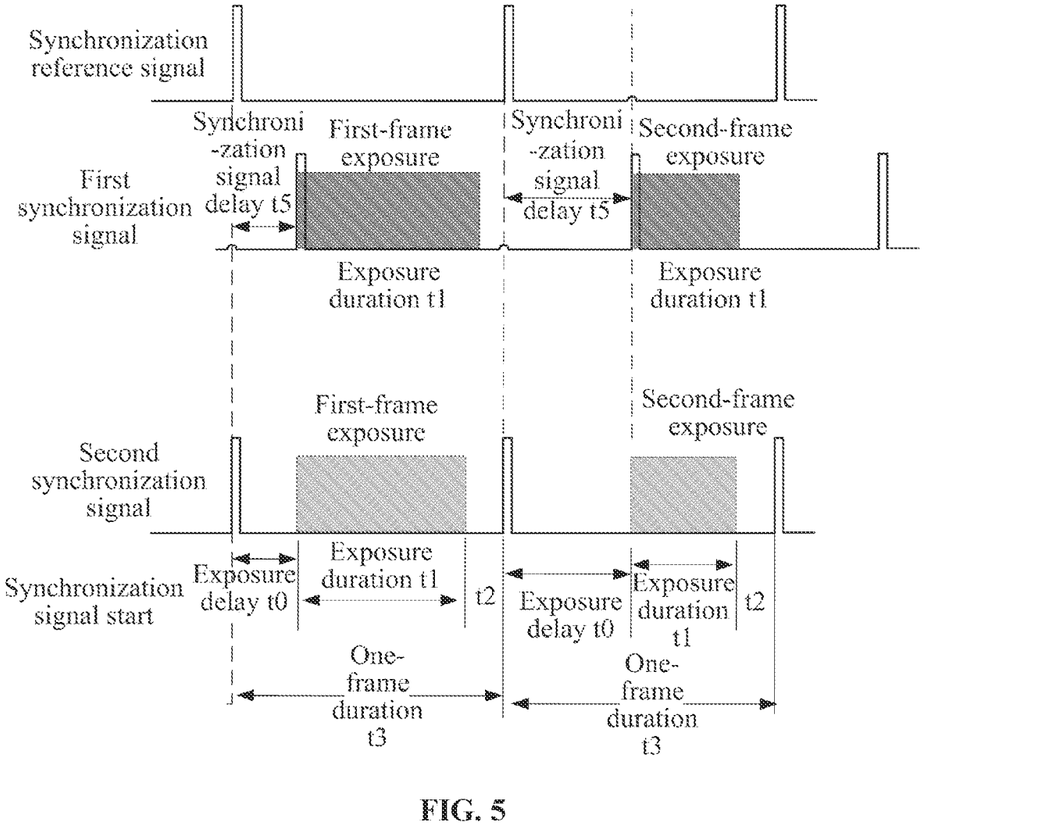
FIG. 5 is a schematic diagram of a shutter synchronization scheme for different types of sensors when the exposure duration changes according to an embodiment of the present application.

In an exemplary embodiment of the present application, when the frame periods of the synchronization reference signal of the m-th frame, the first synchronization signal of the m-th frame and the second synchronization signal of the m-th frame are kept unchanged and the exposure durations of the first synchronization signal of the m-th frame and the second synchronization signal of the m-th frame change, the exposure duration at an (m+1)-th frame becomes shorter, as shown in FIG. 5. The second synchronization signal and the synchronization reference signal change consistently. According to Relation 3, when the one-frame duration is kept unchanged and the exposure duration becomes shorter, the delay t0 may be increased. As shown in FIG. 5, the frame period t3 is kept unchanged, and at the (m+1)-th frame of the sensor corresponding to the second synchronization signal, the exposure duration t1 becomes shorter while the delay t0 becomes longer.

In an exemplary embodiment of the present application, the first synchronization signal is also adjusted with the synchronization signal delay t5 with respect to the synchronization reference signal, and the duration of the synchronization signal delay is equal to the exposure delay t0 of the sensor corresponding to the second synchronization signal. As can be seen in FIG. 5, after the adjustment of the first synchronization signal of the (m+1)-th frame is completed, the exposure areas of the two sensors are aligned with each other.

Figure 6:
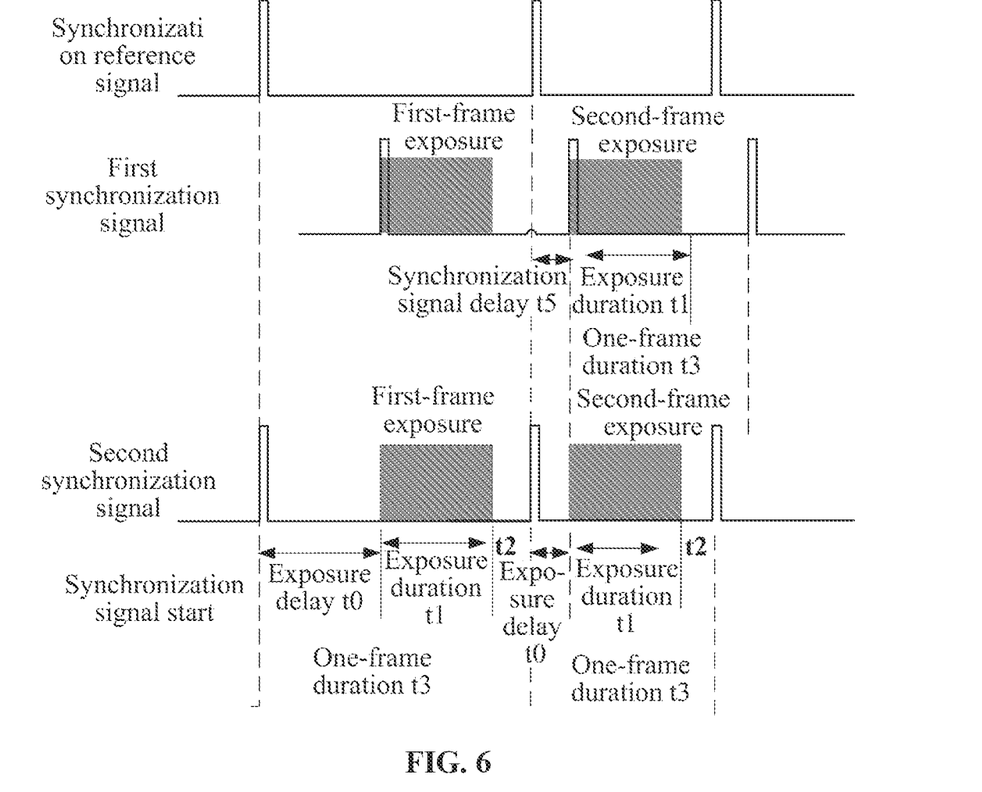
FIG. 6 is a schematic diagram of a shutter synchronization scheme for different types of sensors when the frame period changes according to an embodiment of the present application.

In an exemplary embodiment of the present application, when the frame periods of the synchronization reference signal of the m-th frame, the first synchronization signal of the m-th frame and the second synchronization signal of the m-th frame change synchronously and the exposure durations of the first synchronization signal of the m-th frame and the second synchronization signal of the m-th frame are kept unchanged, the frame rate (or the frame period) at the (m+1)-th frame becomes larger, and the one-frame duration t3 becomes shorter, as shown in FIG. 6. The second synchronization signal and the synchronization reference signal change consistently. If the exposure duration t1 of the shutter of the sensor corresponding to the second synchronization signal needs to be kept from fluctuating with the change of the frame rate, the delay t0 may be adjusted according to Relation 3. As shown in FIG. 6, at the (m+1)-th frame corresponding to the second synchronization signal, the frame rate becomes larger, t3 becomes shorter, the delay t0 becomes shorter, and the exposure duration t1 is kept unchanged.

In an exemplary embodiment of the present application, the first synchronization signal is also adjusted with the delay t5=t0 with respect to the synchronization reference signal. As can be seen in FIG. 6, after the adjustment of the first synchronization signal of the (m+1)-th frame is completed, the exposure areas of the two sensors are aligned with each other.

In an exemplary embodiment of the present application, compared with the shutter synchronization of multiple sensors in the related art, embodiments of the present application adopt a synchronization signal dynamic adjustment mode, and the synchronization signal of the sensor is adjusted according to the changes in the shutter and the frame rate, thereby realizing shutter synchronization of sensors of multiple types.

In an exemplary embodiment of the present application, with the schemes of embodiments of the present application, the camera does not need to use sensors of the same type, and different types of sensors may be added to add new functions to the camera or low-cost sensors may be used to reduce costs.

Figure 7:
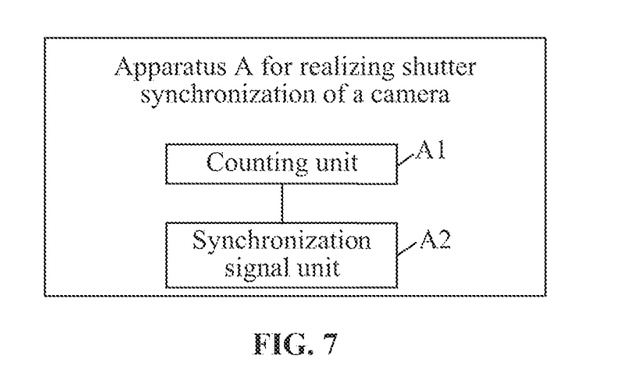
FIG. 7 is a block diagram of an apparatus for realizing shutter synchronization of a camera according to an embodiment of the present application.

The embodiments of the present application further provide an apparatus A for realizing shutter synchronization of a camera. The camera may include multiple sensors, and the shutter types of the multiple sensors are different. As shown in FIG. 7, the apparatus may include a counting unit A1 and a synchronization signal unit A2.

The counting unit A1 may be configured to acquire a periodic synchronization reference signal and a synchronization signal corresponding to each sensor.

The synchronization signal unit A2 may be configured to adjust, with the synchronization reference signal as a reference, at least one of synchronization signal delays or exposure delays of the multiple sensors to align the exposure areas corresponding to the multiple sensors.

In an exemplary embodiment of the present application, counting unit A1 may be configured to generate the periodic synchronization reference signal which may include a synchronization reference signal, a first synchronization signal and a second synchronization signal, and the synchronization reference signal may be used as the reference to the delay adjustment of the synchronization signals (such as the first synchronization signal or the second synchronization signal) corresponding to the sensor.

In an exemplary embodiment of the present application, the multiple sensors may include a first sensor and a second sensor; the synchronization signal may include a first synchronization signal corresponding to the first sensor and a second synchronization signal corresponding to the second sensor. The frame period and the exposure duration of a first synchronization signal of an i-th frame are the same as the frame period and the exposure duration of a second synchronization signal of an i-th frame, where i is a positive integer; the exposure starts from the rising edge of a first synchronization signal of each frame, and the exposure starts after a preset exposure delay is executed on a second synchronization signal of each frame.

When the exposure time period corresponding to a second synchronization signal of a j-th frame is to be aligned with the exposure time period corresponding to a first synchronization signal of a j-th frame, the synchronization signal unit may adjust, with the synchronization reference signals as the reference, the synchronization signal delays and/or the exposure delays of the sensors in the following manners.

The rising edge of the second synchronization signal of the j-th frame is aligned with the rising edge of a synchronization reference signal of a j-th frame, where j is a positive integer.

A delay is performed on the first synchronization signal of the j-th frame with the duration of an exposure delay of the second synchronization signal of the j-th frame as the duration of a synchronization signal delay of the first synchronization signal of the j-th frame and the rising edge of the synchronization reference signal of the j-th frame as a starting point.

Figure 8:
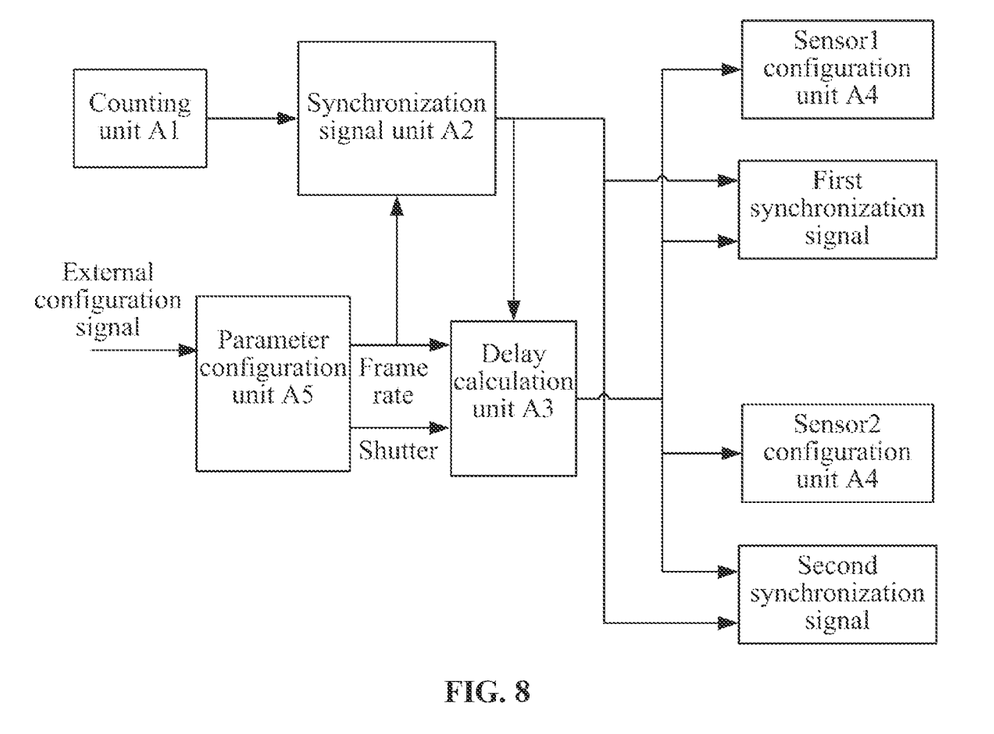
FIG. 8 is a structure diagram of an apparatus for realizing shutter synchronization of a camera according to an embodiment of the present application.

In an exemplary embodiment of the present application, as shown in FIG. 8, the apparatus for realizing shutter synchronization of a camera may further include a delay calculation unit A3.

The delay calculation unit A3 is configured to, when the exposure time period corresponding to a second synchronization signal of an m-th frame is to be aligned with the exposure time period corresponding to a first synchronization signal of an m-th frame and in a case where at least one of the frame periods and the exposure durations of the first synchronization signal of the m-th frame and the second synchronization signal of the m-th frame change, calculate, according to at least on of the change in the frame periods and the change in the exposure durations of the first synchronization signal of the m-th frame and the second synchronization signal of the m-th frame, an exposure delay corresponding to the second synchronization signal of the m-th frame.

The synchronization signal unit A2 may further be configured to align, according to the exposure delay of the second synchronization signal of the m-th frame, the exposure time period of the first synchronization signal of the m-th frame with the exposure time period of the second synchronization signal of the m-th frame.

In an exemplary embodiment of the present application, when the frame rate and the shutter of the sensor change, the delay calculation unit A3 may calculate the delay of the synchronization signal of a next frame according to the change in the shutter and the frame rate. The synchronization signal unit A2 adjusts the delay of the rising edge with respect to the reference signal according to the change in the delay, thereby enabling the exposure areas of the multiple sensors to be aligned with each other.

In an exemplary embodiment of the present application, in order to ensure synchronization, the delay calculation unit A3 completes the calculation before the arrival of the rising edge of the synchronization reference signal and issues the exposure delay and the synchronization signal delay to the synchronization signal unit A2 to take effect before the arrival of the rising edge of the synchronization reference signal.

In an exemplary embodiment of the present application, the block diagram as shown in FIG. 8 only illustrates the case of two different sensors, the above is also suitable to the case of multiple sensors, and each sensor may correspond to one synchronization signal and one sensor configuration unit A4. The sensor configuration unit A4 may be configured to configure the parameter of the corresponding sensor.

In an exemplary embodiment of the present application, the apparatus for realizing shutter synchronization of a camera may further include a parameter configuration unit A5. The parameter configuration unit A5 may be configured to receive an external configuration signal to configure the parameters of multiple units in the apparatus A for realizing shutter synchronization of a camera.

Figure 9:
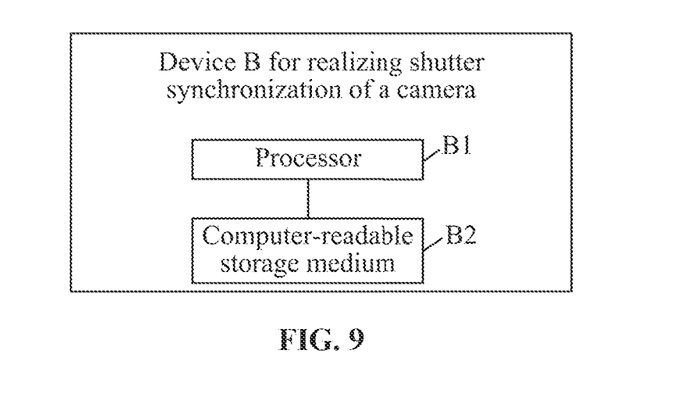
FIG. 9 is a block diagram of a device for realizing shutter synchronization of a camera according to an embodiment of the present application.

Embodiments of the present application further provide a device B for realizing shutter synchronization of a camera. As shown in FIG. 9, the device may include a processor B1 and a computer-readable storage medium B2. The computer-readable storage medium B2 is configured to store instructions, where the instructions, when executed by the processor B1, implement the method for realizing shutter synchronization of a camera described above. The computer-readable storage medium B2 may be a non-transitory storage medium.

In an exemplary embodiment of the present application, the processor B1 may be implemented as a field-programmable gate array (FPGA) chip or a processor chip such as a microcontroller unit (MCU) processor.

In an exemplary embodiment of the present application, any of the method embodiments described above is applicable to the apparatus embodiment here, and the details are not repeated here.

The embodiments of the present application further provide a storage medium including computer-executable instructions. The computer-executable instructions are used for, when executed by a computer processor, performing a method for realizing shutter synchronization of a camera, where the camera includes multiple sensors, and the shutter types of the multiple sensors are different. The method includes the following steps.

A periodic synchronization reference signal and a synchronization signal corresponding to each sensor are acquired.

With the synchronization reference signal as a reference, synchronization signal delays and/or exposure delays of the multiple sensors are adjusted to align the exposure areas corresponding to the multiple sensors.

The computer storage medium in the embodiments of the present application may adopt any combination of one or more computer-readable storage media. The computer-readable storage medium may be a computer-readable signal storage medium. The storage medium may be a non-transitory storage medium. The computer-readable storage medium may be an electrical, magnetic, optical, electromagnetic, infrared or semiconductor system, apparatus or device, or any combination thereof. In the embodiments of the present application, the computer-readable storage medium may be any tangible storage medium including or storing a program. The program may be used by or used in conjunction with an instruction execution system, apparatus or device.

The computer-readable signal storage medium may include a propagated data signal with computer-readable program codes embodied therein, for example, in a baseband or as a part of a carrier wave. Such a propagated data signal may take any of a variety of forms, including, but not limited to, electro-magnetic, optical, or any suitable combination thereof. The computer-readable signal storage medium may also be any computer-readable storage medium that is not a computer-readable storage medium and that can communicate, propagate, or transport a program for use by or in connection with an instruction execution system, apparatus or device.

The program codes included on the computer-readable storage medium may be transmitted via any suitable medium, including, and not limited to, wireless, wireline, optical fiber cable, radio frequency (RF), or any suitable combination thereof. Some or all steps of the preceding method and function modules/units in the preceding system or apparatus may be implemented as software, firmware, hardware, and suitable combinations thereof. In a hardware implementation, the division of the function modules/units may not correspond to the division of physical components. For example, one physical component may have several functions, or one function or step may be performed jointly by several physical components. Some or all components may be implemented as software executed by a processor such as a digital signal processor or a microprocessor, may be implemented as hardware, or may be implemented as integrated circuits such as application-specific integrated circuits. Such software may be distributed on computer-readable media. The computer-readable media may include computer storage media (or non-transitory media) and communication media (or transitory media). The term computer storage media includes volatile and non-volatile, removable and non-removable media implemented in any method or technology for storing information (such as computer-readable instructions, data structures, program modules or other data). The computer storage media include a random-access memory (RAM), a read-only memory (ROM), an electrically erasable programmable read-only memory (EEPROM), a flash memory or other memory technologies, a compact disc read-only memory (CD-ROM), a digital video disk (DVD) or other optical storages, a magnetic cassette, a magnetic tape, a magnetic disk or other magnetic storage devices, or any other medium that can be used for storing desired information and that can be accessed by a computer. The communication media generally include computer-readable instructions, data structures, program modules or other data in a modulated data signal such as a carrier wave or other transport mechanisms and may include any information delivery media.

What is claimed is:

1. A method for realizing shutter synchronization of a camera, wherein the camera comprises a plurality of sensors; shutter types of the plurality of sensors are different; the method comprises:
   acquiring a periodic synchronization reference signal and a synchronization signal corresponding to each of the plurality of sensors; and
   adjusting, with the synchronization reference signal as a reference, at least one of synchronization signal delays or exposure delays of the plurality of sensors to align exposure areas corresponding to the plurality of sensors;
   wherein the plurality of sensors comprise a first sensor and a second sensor; the synchronization signal comprises: a first synchronization signal corresponding to the first sensor and a second synchronization signal corresponding to the second sensor; and
   wherein a frame period and an exposure duration of a first synchronization signal of an i-th frame are same as a frame period and an exposure duration of a second synchronization signal of an i-th frame, wherein i is a positive integer; an exposure starts from a rising edge of a first synchronization signal of each frame, and an exposure starts after a preset exposure delay is executed on a second synchronization signal of each frame.

2. The method of claim 1, wherein in a case where an exposure time period corresponding to a second synchronization signal of a j-th frame is to be aligned with an exposure time period corresponding to a first synchronization signal of a j-th frame, adjusting, with the synchronization reference signal as the reference, at least one of the synchronization signal delays or the exposure delays of the plurality of sensors comprises:
   aligning a rising edge of the second synchronization signal of the j-th frame with a rising edge of a synchronization reference signal of a j-th frame, wherein j is a positive integer; and
   performing, with a duration of an exposure delay of the second synchronization signal of the j-th frame as a duration of a synchronization signal delay of the first synchronization signal of the j-th frame and the rising edge of the synchronization reference signal of the j-th frame as a starting point, a delay on the first synchronization signal of the j-th frame.

3. The method of claim 1, further comprising:
   in a case where an exposure time period corresponding to a second synchronization signal of an m-th frame is to be aligned with an exposure time period corresponding to a first synchronization signal of an m-th frame and in a case where at least one of frame periods or exposure durations of the first synchronization signal of the m-th frame and the second synchronization signal of the m-th frame change, calculating, according to at least one of a change in the frame periods or a change in the exposure durations of the first synchronization signal of the m-th frame and the second synchronization signal of the m-th frame, an exposure delay corresponding to the second synchronization signal of the m-th frame, wherein m is a positive integer; and wherein adjusting, with the synchronization reference signal as the reference, at least one of the synchronization signal delays or the exposure delays of the plurality of sensors comprises: aligning, according to the exposure delay of the second synchronization signal of the m-th frame, the exposure time period of the first synchronization signal of the m-th frame with the exposure time period of the second synchronization signal of the m-th frame.

4. The method of claim 3, further comprising: completing calculation of the exposure delay corresponding to the second synchronization signal of the m-th frame before an arrival of a rising edge of a synchronization reference signal of an m-th frame.

5. The method of claim 3, wherein aligning, according to the exposure delay of the second synchronization signal of the m-th frame, the exposure time period of the first synchronization signal of the m-th frame with the exposure time period of the second synchronization signal of the m-th frame comprises:

aligning a rising edge of the second synchronization signal of the m-th frame with the rising edge of the synchronization reference signal of the m-th frame;

adjusting, according to the exposure delay of the second synchronization signal of the m-th frame, a delay of a rising edge of the exposure time period corresponding to the first synchronization signal of the m-th frame with respect to the rising edge of the synchronization reference signal of the m-th frame; and performing, with a duration of the exposure delay of the second synchronization signal of the m-th frame as a duration of a synchronization signal delay of the first synchronization signal of the m-th frame and the rising edge of the synchronization reference signal of the m-th frame as a starting point, a delay on the first synchronization signal of the m-th frame.

6. A device for realizing shutter synchronization of a camera, comprising a processor and a non-transitory computer-readable storage medium, wherein the computer-readable storage medium is configured to store instructions, wherein the instructions, when executed by the processor, cause the processor to implement:

acquiring a periodic synchronization reference signal and a synchronization signal corresponding to each of the plurality of sensors; and adjusting, with the synchronization reference signal as a reference, at least one of synchronization signal delays or exposure delays of the plurality of sensors to align exposure areas corresponding to the plurality of sensors;

wherein the plurality of sensors comprise a first sensor and a second sensor; the synchronization signal comprises: a first synchronization signal corresponding to the first sensor and a second synchronization signal corresponding to the second sensor; and wherein a frame period and an exposure duration of a first synchronization signal of an i-th frame are same as a frame period and an exposure duration of a second synchronization signal of an i-th frame, wherein i is a positive integer; an exposure starts from a rising edge of a first synchronization signal of each frame, and an exposure starts after a preset exposure delay is executed on a second synchronization signal of each frame.

7. The method of claim 4, wherein aligning, according to the exposure delay of the second synchronization signal of the m-th frame, the exposure time period of the first synchronization signal of the m-th frame with the exposure time period of the second synchronization signal of the m-th frame comprises:

aligning a rising edge of the second synchronization signal of the m-th frame with the rising edge of the synchronization reference signal of the m-th frame;

adjusting, according to the exposure delay of the second synchronization signal of the m-th frame, a delay of a rising edge of the exposure time period corresponding to the first synchronization signal of the m-th frame with respect to the rising edge of the synchronization reference signal of the m-th frame; and performing, with a duration of the exposure delay of the second synchronization signal of the m-th frame as a duration of a synchronization signal delay of the first synchronization signal of the m-th frame and the rising edge of the synchronization reference signal of the m-th frame as a starting point, a delay on the first synchronization signal of the m-th frame.

8. The device of claim 6, wherein in a case where an exposure time period corresponding to a second synchronization signal of a j-th frame is to be aligned with an exposure time period corresponding to a first synchronization signal of a j-th frame, the processor is caused to adjust, with the synchronization reference signal as the reference, at least one of the synchronization signal delays or the exposure delays of the plurality of sensors in the following manners:

aligning a rising edge of the second synchronization signal of the j-th frame with a rising edge of a synchronization reference signal of a j-th frame, wherein j is a positive integer; and performing, with a duration of an exposure delay of the second synchronization signal of the j-th frame as a duration of a synchronization signal delay of the first synchronization signal of the j-th frame and the rising edge of the synchronization reference signal of the j-th frame as a starting point, a delay on the first synchronization signal of the j-th frame.

9. The device of claim 6, the processor is further caused to implement:

in a case where an exposure time period corresponding to a second synchronization signal of an m-th frame is to be aligned with an exposure time period corresponding to a first synchronization signal of an m-th frame and in a case where at least one of frame periods or exposure durations of the first synchronization signal of the m-th frame and the second synchronization signal of the m-th frame change, calculating, according to at least one of a change in the frame periods or a change in the exposure durations of the first synchronization signal of the m-th frame and the second synchronization signal of the m-th frame, an exposure delay corresponding to the second synchronization signal of the m-th frame, wherein m is a positive integer; and wherein adjusting, with the synchronization reference signal as the reference, at least one of the synchronization signal delays or the exposure delays of the plurality of sensors comprises: aligning, according to the exposure delay of the second synchronization signal of the m-th frame, the exposure time period of the first synchronization signal of the m-th frame with the exposure time period of the second synchronization signal of the m-th frame.

10. The device of claim 9, the processor is further caused to implement: completing calculation of the exposure delay corresponding to the second synchronization signal of the m-th frame before an arrival of a rising edge of a synchronization reference signal of an m-th frame.

11. The device of claim 9, wherein the processor is further caused to align, according to the exposure delay of the second synchronization signal of the m-th frame, the exposure time period of the first synchronization signal of the m-th frame with the exposure time period of the second synchronization signal of the m-th frame in the following manners:
 aligning a rising edge of the second synchronization signal of the m-th frame with the rising edge of the synchronization reference signal of the m-th frame;
 adjusting, according to the exposure delay of the second synchronization signal of the m-th frame, a delay of a rising edge of the exposure time period corresponding to the first synchronization signal of the m-th frame with respect to the rising edge of the synchronization reference signal of the m-th frame; and
 performing, with a duration of the exposure delay of the second synchronization signal of the m-th frame as a duration of a synchronization signal delay of the first synchronization signal of the m-th frame and the rising edge of the synchronization reference signal of the m-th frame as a starting point, a delay on the first synchronization signal of the m-th frame.

12. The device of claim 10, wherein the processor is further caused to align, according to the exposure delay of the second synchronization signal of the m-th frame, the exposure time period of the first synchronization signal of the m-th frame with the exposure time period of the second synchronization signal of the m-th frame in the following manners:
 aligning a rising edge of the second synchronization signal of the m-th frame with the rising edge of the synchronization reference signal of the m-th frame;
 adjusting, according to the exposure delay of the second synchronization signal of the m-th frame, a delay of a rising edge of the exposure time period corresponding to the first synchronization signal of the m-th frame with respect to the rising edge of the synchronization reference signal of the m-th frame; and
 performing, with a duration of the exposure delay of the second synchronization signal of the m-th frame as a duration of a synchronization signal delay of the first synchronization signal of the m-th frame and the rising edge of the synchronization reference signal of the m-th frame as a starting point, a delay on the first synchronization signal of the m-th frame.

13. A non-transitory computer readable storage medium storing computer-executable instructions, wherein the computer-executable instructions, when executed by a processor, cause the processor to implement:
 acquiring a periodic synchronization reference signal and a synchronization signal corresponding to each of the plurality of sensors; and
 adjusting, with the synchronization reference signal as a reference, at least one of synchronization signal delays or exposure delays of the plurality of sensors to align exposure areas corresponding to the plurality of sensors;
 wherein the plurality of sensors comprise a first sensor and a second sensor; the synchronization signal comprises: a first synchronization signal corresponding to the first sensor and a second synchronization signal corresponding to the second sensor; and
 wherein a frame period and an exposure duration of a first synchronization signal of an i-th frame are same as a frame period and an exposure duration of a second synchronization signal of an i-th frame, wherein i is a positive integer; an exposure starts from a rising edge of a first synchronization signal of each frame, and an exposure starts after a preset exposure delay is executed on a second synchronization signal of each frame.

14. The storage medium of claim 13, wherein in a case where an exposure time period corresponding to a second synchronization signal of a j-th frame is to be aligned with an exposure time period corresponding to a first synchronization signal of a j-th frame, the processor is caused to adjust, with the synchronization reference signal as the reference, at least one of the synchronization signal delays or the exposure delays of the plurality of sensors in the following manners:
 aligning a rising edge of the second synchronization signal of the j-th frame with a rising edge of a synchronization reference signal of a j-th frame, wherein j is a positive integer; and
 performing, with a duration of an exposure delay of the second synchronization signal of the j-th frame as a duration of a synchronization signal delay of the first synchronization signal of the j-th frame and the rising edge of the synchronization reference signal of the j-th frame as a starting point, a delay on the first synchronization signal of the j-th frame.

15. The storage medium of claim 13, the processor is further caused to implement:
 in a case where an exposure time period corresponding to a second synchronization signal of an m-th frame is to be aligned with an exposure time period corresponding to a first synchronization signal of an m-th frame and in a case where at least one of frame periods or exposure durations of the first synchronization signal of the m-th frame and the second synchronization signal of the m-th frame change, calculating, according to at least one of a change in the frame periods or a change in the exposure durations of the first synchronization signal of the m-th frame and the second synchronization signal of the m-th frame, an exposure delay corresponding to the second synchronization signal of the m-th frame, wherein m is a positive integer; and
 wherein adjusting, with the synchronization reference signal as the reference, at least one of the synchronization signal delays or the exposure delays of the plurality of sensors comprises: aligning, according to the exposure delay of the second synchronization signal of the m-th frame, the exposure time period of the first synchronization signal of the m-th frame with the exposure time period of the second synchronization signal of the m-th frame.

16. The storage medium of claim 15, the processor is further caused to implement: completing calculation of the exposure delay corresponding to the second synchronization signal of the m-th frame before an arrival of a rising edge of a synchronization reference signal of an m-th frame.

17. The storage medium of claim 15, wherein the processor is further caused to align, according to the exposure delay of the second synchronization signal of the m-th frame, the exposure time period of the first synchronization signal of the m-th frame with the exposure time period of the second synchronization signal of the m-th frame in the following manners:
 aligning a rising edge of the second synchronization signal of the m-th frame with the rising edge of the synchronization reference signal of the m-th frame;

adjusting, according to the exposure delay of the second synchronization signal of the m-th frame, a delay of a rising edge of the exposure time period corresponding to the first synchronization signal of the m-th frame with respect to the rising edge of the synchronization reference signal of the m-th frame; and performing, with a duration of the exposure delay of the second synchronization signal of the m-th frame as a duration of a synchronization signal delay of the first synchronization signal of the m-th frame and the rising edge of the synchronization reference signal of the m-th frame as a starting point, a delay on the first synchronization signal of the m-th frame.

* * * * *